Patented July 22, 1941

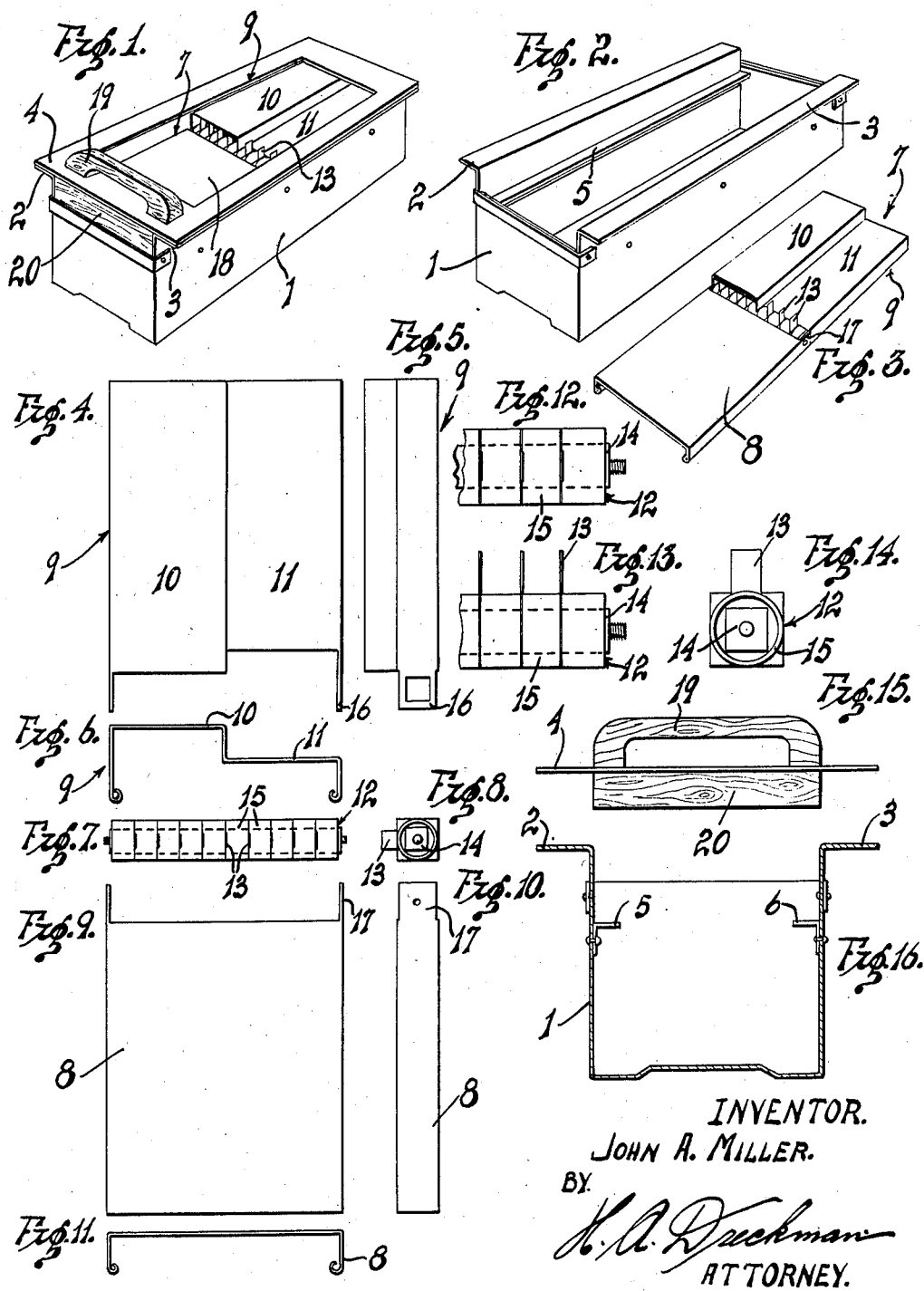

2,250,028

UNITED STATES PATENT OFFICE 2,250,028

VEGETABLE CUTTER

John A. Miller, Long Beach, Calif., assignor of twenty-five per cent to Carol E. Rich, Long Beach, Calif.

Application April 13, 1940, Serial No. 329,474

3 Claims. (Cl. 146—169)

This invention relates to a cutter, particularly useful in the cutting of vegetables, fruits, and the like, and the prime object of my invention is to provide a novel cutter, in which fruits or vegetables may be cut in various shapes and sizes, for example into strings, cubes, etc.

Another object of my invention is to provide a novel vegetable cutter, which is simple in construction, which can be readily disassembled for purposes of cleaning, and which is simple and easy to operate.

A feature of my invention resides in the novel cutter plate, whereby fruit or vegetables may be either sliced or cubed, as desired.

Another feature of my invention resides in the novel cutter plate assembly, and also in the novel knife assembly.

Other objects, advantages and features of invention may appear from the accompanying drawing, the subjoined detailed description, and the appended claims.

In the drawing.

Figure 1 is a perspective view of the completely assembled vegetable cutter.

Figure 2 is a perspective view of the outer box.

Figure 3 is a perspective view of the cutter plate assembly.

Figure 4 is a top plan view of one part of the cutter plate.

Figure 5 is a side view of the same.

Figure 6 is an end view of the same.

Figure 7 is a top plan view of the cutter bar assembly.

Figure 8 is an end view of the same.

Figure 9 is a top plan view of another part of the cutter tray.

Figure 10 is a side view of the same.

Figure 11 is an end view of the same.

Figure 12 is a fragmentary, plan view on an enlarged scale of the cutter bar assembly.

Figure 13 is a side elevation of the same.

Figure 14 is an end view of the same.

Figure 15 is an end view of the slide.

Figure 16 is a transverse, sectional view of the outer box.

Referring more particularly to the drawing, the numeral 1 indicates the outer box, which is preferably rectangular in shape and is formed of a suitable metal, so that it will be rigid when in use. The upper edges of the side walls of the box 1 are bent outwardly, as shown at 2 and 3, to provide a trackway for the slide plate 4, which rests on top of the box 1, as shown in Figure 1. A pair of angles 5, 6 extend longitudinally of the box 1, and are mounted on the inside of this box, as shown in Figure 16, and these angles are arranged somewhat below the upper edge of the end walls of the box. These angles serve as supports for the cutter plate 7, said plate resting on the angles 5 and 6 when the vegetable cutter is in use, and this cutter plate can be easily removed from the box 1 when it is desired to clean the same. The cutter plate 7 consists of a feed section 8, the upper surface of which is flat and in cross-section is substantially channel shaped. A cutter section 9 is arranged end to end with the section 8, and is stepped in cross-section, one cutting portion 10 of which is higher than the non-cutting part 11. The noncutting part 11 is substantially in alignment with the top surface of the feed section 8.

The cutter bar 12 consists of a plurality of spaced knives 13, which are arranged along a rectangular post 14. Spacing washers 15 space the knives 13 along the post 14, substantially as shown. The cutter section 9 is provided with a pair of extending ears 16, 16, which have a square hole cut in them, the end of the post 14 fitting into this square hole in the ears. The feed section 8 is provided with ears 17 and a cap screw bolt, or the like, extends through the ears 17 and into the end of the post 14, thus holding the cutter plate in assembled position, and also holding the knives or blades 13 in proper position. From an examination of Figures 1 and 3, it will be noted that the noncutting part 11 is substantially in alignment with the bottom of the cutter blades 13, as is also the top surface of the feed section 8. The raised cutting part 10 is substantially in alignment with the top of the cutter blades 13, and the forward edge of the cutting part 10, particularly the horizontal portion, also acts as a cutter.

When it is desired to dice the fruit or vegetables, they are first moved over the right hand part of the cutter bar—that is, so that the fruit or vegetable passes onto the surface 11. The vegetable is then turned at an angle of ninety (90) degrees, and is moved to the left, and again pushed against the knives, thus cubing the vegetable or fruit. If it is desired to only shred or string the fruits or vegetables, it is moved against that portion of the cutter bar which lies within the cutting surface 10. The slide plate 4, which rests on top of the box 1, as shown in Figure 1, is provided with a central, rectangular opening 18. A handle 19 is attached to one end of the slide plate. A bumper block 20 is secured to the underside of the slide plate 4, and preferably at one end thereof, the purpose of this bumper block being to force the fruit or vegetables against the blades 13 when the slide plate 4 is pushed upwardly, and with the fruit or vegetable resting on the upper surface of the feed section 8.

Having described my invention, I claim:

1. A vegetable cutter comprising a substantially rectangular box, a slide plate slidably mounted on the box, said slide-plate having a central opening therein, a pair of rails extending longitudinally within the box, a cutter plate resting on the rails, said cutter plate including a longitudinal feed section, a longitudinal discharge section, and therebetween a transverse knife assembly consisting of a plurality of spaced knives, each knife facing the feed section and extending outwardly from the level of the feed section toward the slide-plate, said discharge section divided across its width into a non-cutting and a cutting section, the non-cutting section being substantially in alignment with the feed section and the cutting section being substantially in alignment with the outward ends of the knives.

2. A vegetable cutter comprising a substantially rectangular box, a slide plate slidably mounted on the box, said slide-plate having a central opening therein, a pair of rails extending longitudinally within the box, a cutter plate resting on the rails, said cutter plate including a longitudinal feed section, a longitudinal discharge section, and therebetween a transverse knife assembly consisting of a plurality of spaced knives, each knife facing the feed section and extending outwardly from the level of the feed section toward the slide-plate, said discharge section divided across its width into a non-cutting and a cutting section, the non-cutting section being substantially in alignment with the feed section and the cutting section being substantially in alignment with the outward ends of the knives, and means securing the feed section and the discharge section to the knife assembly.

3. A vegetable cutter comprising a substantially rectangular box, a slide plate slidably mounted on the box, said slide-plate having a central opening therein, a pair of rails extending longitudinally in the box, a cutter plate resting on the rails, said cutter plate including a longitudinal feed section, a longitudinal discharge section, and therebetween a transverse knife assembly consisting of a plurality of spaced knives, each knife facing the feed section and extending outwardly from the level of the feed section toward the slide-plate, said discharge section divided across its width into a non-cutting and a cutting section, the non-cutting section being substantially in alignment with the feed section and the cutting section being substantially in alignment with the outward ends of the knives, said knife assembly comprising a post, the spaced knives being mounted on the post, and means securing both the discharge section and feed section to said post.

JOHN A. MILLER.